US010528850B2

(12) United States Patent
Surnilla et al.

(10) Patent No.: US 10,528,850 B2
(45) Date of Patent: Jan. 7, 2020

(54) OBJECT CLASSIFICATION ADJUSTMENT BASED ON VEHICLE COMMUNICATION (71) Applicant: Ford Global Technologies, LLC, Dearborn, MI (US)

(72) Inventors: Gopichandra Surnilla, West Bloomfield, MI (US); Stephen B. Smith, Livonia, MI (US); Daniel A. Makled, Dearborn, MI (US); Michael Mcquillen, Warrren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 15/341,050

(22) Filed: Nov. 2, 2016

(65) Prior Publication Data

US 2018/0121763 A1 May 3, 2018

(51) Int. Cl.
| G06K 9/00 | (2006.01) |
| G06K 9/62 | (2006.01) |
| G08G 1/16 | (2006.01) |
| H04L 29/08 | (2006.01) |

(52) U.S. Cl.
CPC ....... *G06K 9/6267* (2013.01); *G06K 9/00791* (2013.01); *G08G 1/16* (2013.01); *H04L 67/12* (2013.01)

(58) Field of Classification Search
CPC .... B60R 21/01538; G06T 2207/30261; G06T 2207/30252; G06T 2207/30248; G06K 2209/23; G06K 9/00791; G01C 21/3602
See application file for complete search history.

(56) References Cited

U.S. PATENT DOCUMENTS 7,054,467 B1 * 5/2006 Honda .................... G01S 3/784
382/104
7,796,820 B2 9/2010 Simon et al.
(Continued)

FOREIGN PATENT DOCUMENTS

| EP | 3121762 A1 | 1/2017 |
| EP | 3232416 A1 | 10/2017 |
| JP | 2016018407 A | 2/2016 |

OTHER PUBLICATIONS

Tischler, Karin, and Britta Hummel. "Enhanced environmental perception by inter-vehicle data exchange." Intelligent Vehicles Symposium, 2005. Proceedings. IEEE. IEEE, 2005. (Year: 2005).*
(Continued)

*Primary Examiner* — Avinash Yentrapati
(74) *Attorney, Agent, or Firm* — Frank Lollo; Eversheds Sutherland (US) LLP (57) ABSTRACT Method, apparatus and computer readable media are disclosed for object classification adjustment based on vehicle communication. An example vehicle includes a camera to detect an object and an object classifier. The example object classifier is to determine first classification data for the object. The first classification data includes a classification confidence of the object. Also, the example object classifier is to associate second classification data for the object with the first classification data. The second classification data is collected from a second vehicle. Additionally, the example object classifier is to adjust the classification confidence of the object based on the second classification data.

17 Claims, 4 Drawing Sheets

(56) References Cited

U.S. PATENT DOCUMENTS

| | | | | |
|---|---|---|---|---|
| 7,994,902 B2* | 8/2011 | Avery | | G08G 1/161 |
| | | | | 340/435 |
| 8,948,454 B2* | 2/2015 | Datta | | G06K 9/6256 |
| | | | | 382/103 |
| 9,201,421 B1 | 12/2015 | Fairfield et al. | | |
| 9,230,441 B2 | 1/2016 | Sung et al. | | |
| 9,333,954 B2 | 5/2016 | Tobias | | |
| 9,671,493 B1* | 6/2017 | Khosla | | G01S 13/867 |
| 9,830,814 B2* | 11/2017 | Thompson | | G08G 1/04 |
| 2007/0086624 A1* | 4/2007 | Breed | | G06K 9/00362 |
| | | | | 382/104 |
| 2008/0112593 A1* | 5/2008 | Ratner | | G06K 9/469 |
| | | | | 382/103 |
| 2008/0300787 A1* | 12/2008 | Zeng | | G01S 7/4026 |
| | | | | 701/301 |
| 2010/0054540 A1* | 3/2010 | Brown | | G06K 9/00369 |
| | | | | 382/107 |
| 2010/0198513 A1* | 8/2010 | Zeng | | B60W 40/02 |
| | | | | 701/300 |
| 2010/0209890 A1* | 8/2010 | Huang | | G09B 9/05 |
| | | | | 434/65 |
| 2010/0253489 A1* | 10/2010 | Cui | | G01S 13/723 |
| | | | | 340/425.5 |
| 2011/0216158 A1* | 9/2011 | Bigioi | | G06T 5/006 |
| | | | | 348/36 |
| 2013/0272548 A1* | 10/2013 | Visser | | G06K 9/00624 |
| | | | | 381/122 |
| 2014/0028457 A1* | 1/2014 | Reinpoldt | | G08B 13/2494 |
| | | | | 340/552 |
| 2014/0104077 A1* | 4/2014 | Engel | | G08G 1/0962 |
| | | | | 340/901 |
| 2014/0195112 A1* | 7/2014 | Lu | | B60G 17/015 |
| | | | | 701/37 |
| 2014/0195138 A1* | 7/2014 | Stelzig | | G08G 1/0116 |
| | | | | 701/119 |
| 2014/0324266 A1* | 10/2014 | Zhu | | G01W 1/00 |
| | | | | 701/23 |
| 2015/0019080 A1* | 1/2015 | Schneider | | B60W 30/12 |
| | | | | 701/41 |
| 2015/0161441 A1* | 6/2015 | Robinson | | G06K 9/00791 |
| | | | | 382/113 |
| 2015/0178998 A1* | 6/2015 | Attard | | G07C 5/008 |
| | | | | 701/23 |
| 2017/0109644 A1* | 4/2017 | Nariyambut Murali | | |
| | | | | G06N 20/00 |
| 2017/0293808 A1* | 10/2017 | Jain | | G06K 9/00791 |
| 2018/0367871 A1* | 12/2018 | Zeng | | G01S 13/86 |

OTHER PUBLICATIONS

Search Report dated Apr. 27, 2018 for Great Britain Patent Application No. GB 1717727.0 (4 pages).

* cited by examiner

OBJECT CLASSIFICATION ADJUSTMENT BASED ON VEHICLE COMMUNICATION

TECHNICAL FIELD

The present disclosure generally relates to object classification and, more specifically, to object classification adjustment based on vehicle communication.

BACKGROUND

A vehicle typically includes sensors to monitor characteristics of the vehicle and/or an environment in which the vehicle is located. Oftentimes, vehicles include a camera to detect a presence of a nearby object. In some examples, images obtained from the camera may be analyzed to categorize the object into a particular type. For example, the object may be categorized as another vehicle, a pedestrian, an animal, etc. The categorization of the detected object may be used to facilitate operation of safety systems of the vehicle (e.g., blind-spot detection, automatic emergency braking).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for object classification adjustment based on vehicle communication. An example disclosed vehicle includes a camera to detect an object and an object classifier. The example object classifier is to determine first classification data for the object. The first classification data includes a classification confidence of the object. Also, the example object classifier is to associate second classification data for the object with the first classification data. The second classification data is collected from a second vehicle. Additionally, the example object classifier is to adjust the classification confidence of the object based on the second classification data.

An example disclosed method to adjust an object classification for a vehicle includes detecting an object via a camera of a first vehicle and determining, via a processor, first classification data for the object that includes a classification confidence. The example method also includes collecting second classification data for the object from a second vehicle, associating the first classification data and the second classification data, and adjusting the classification confidence based on the second classification data.

An example tangible computer storage medium includes instructions, which, when executed, cause a machine to detect an object via a camera of a first vehicle and determine, via a processor, first classification data for the object that includes a classification confidence. The instructions also cause the machine to collect second classification data for the object from a second vehicle, associate the first classification data and the second classification data, and adjust the classification confidence based on the second classification data.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles typically includes sensors. Generally, the sensors of a vehicles monitors characteristics of the vehicle and/or an environment in which the vehicle is located. Some vehicles include a sensor and/or a camera that detects a presence of a nearby object. Further, some such vehicles include an image recognition system and/or other object identification system that identifies and/or categorizes the detected object. For example, the object identification system may categorize a detected object as a vehicle (e.g., a car, a pickup truck, a van), a truck (e.g., semi-truck, a large van, a bus), a motorcycle, bicycle, a pedestrian, an animal, or an unknown object. In some instances, the detected objects are categorized to facilitate operation of safety and/or other systems of the vehicle (e.g., blind-spot detection, automatic emergency braking, etc., lane warning, self-driving, etc.). For example, the automatic emergency braking system may operate differently if a motorcycle is identified as opposed to a truck.

In some instances, object identification systems of vehicles may not be unable to accurately identify a nearby object. For example, the object identification system may be unable to identify an object as a result of the camera collecting data for the object identification system may be damaged, out-of-focus and/or unable to collect accurate data on objects beyond a particular distance. In some examples, the object identification system is unable to classify and/or inaccurately classifies a classification of the object. In other examples, the object identification system may be able to classify an object, but unable to meet a corresponding confidence threshold (e.g., the object classification is 50% confident that an object is an animal, and the confidence threshold is 75%).

The example apparatus, methods, and machine readable media disclosed herein increase confidence in a vehicle's classification of a nearby object by supplementing classification data collected by the vehicle with other classification data collected from other nearby vehicles. An example vehicle disclosed herein includes a camera that detects the object and an object classifier that determines first classification data associated with the object. For example, the first classification data associated with the object may include a classification (e.g., a vehicle, a truck, a motorcycle, a bicycle, a pedestrian, an animal, etc.) of the object, a classification confidence score or value (e.g., a probability, a percentage, etc.), and a location of the object. The first classification data may be determined based on visual data of the object that is collected via the camera. Additionally or alternatively, the first classification data (e.g., the location of the object) is determined based on data (e.g., location data) collected from other sensors (e.g., a radar sensor) of the vehicle.

To supplement the first classification data with additional classification data, the vehicle includes a communications module (e.g., a dedicated short-range communications) that communications with other nearby vehicles. For example, the communications module of the vehicle broadcasts the first classification data to the other nearby vehicles to enable the other nearby vehicles to identify additional classification data associated with the object. Upon the other nearby vehicles identifying the additional classification data, the communications module of the vehicle collects, retrieves and/or otherwise obtains the additional classification data from the other nearby vehicles. For example, the vehicle collects second classification data (e.g., from a second vehicle or a roadside unit), third classification data (e.g., from a third vehicle or a roadside unit), etc.

Upon receiving the additional classification data from the other nearby vehicles, the object classifier of the vehicle associates the first classification data with the additional classification data. For example, the object classifier of the vehicle correlates the first classification data with the other classification data based on a comparison of location data of the classification data. For example, the first classification data may include a first location of the object, and classification data of another vehicle may identify a location of a detected object. In such examples, the object classifier associates the first classification data of the vehicle with the classification data of the other vehicle if the location data (or other characteristics of the classification data) of the other vehicle is similar to that of the first classification data.

Based on the additional classification data of the nearby vehicles, the classification identifier of the vehicle adjusts the classification and/or the classification confidence of the first classification data associated with the object. In some examples, the classification and/or the classification confidence is further adjusted based on a reliability score that the vehicle has determined for the source of the other classification data (e.g., the other nearby vehicles). For example, if the vehicle determines that classification data of a nearby vehicle is unreliable, any adjustments based on the classification data of that nearby vehicle is reduced. In contrast, adjustments may be increased in scale if they are based on classification data obtained from a reliable vehicle.

Figure 1:
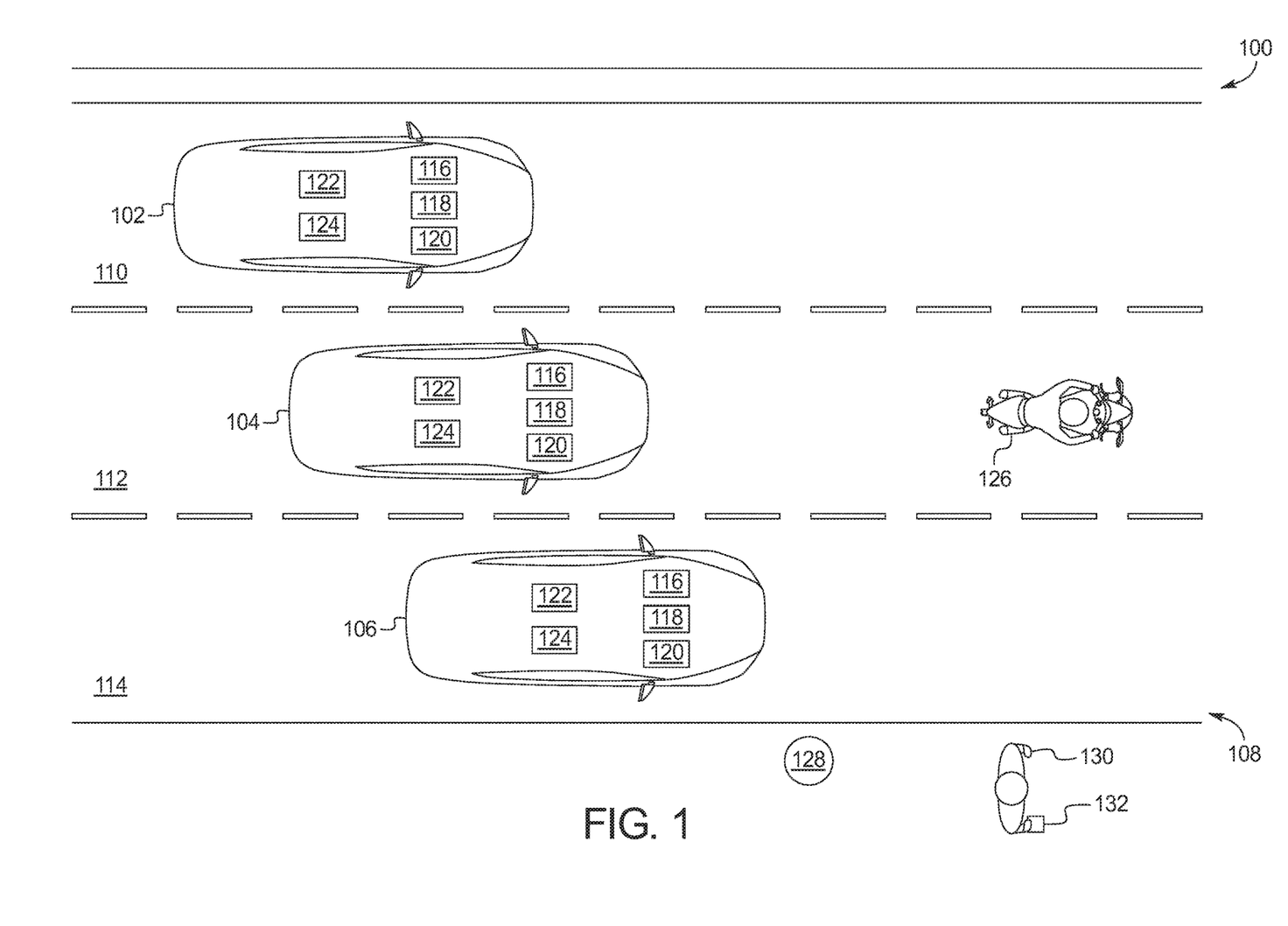
FIG. 1 illustrates an object classification system for vehicles in accordance with the teachings herein.

Turning to the figures, FIG. 1 illustrates an object classification system 100 for vehicles in accordance with the teachings herein. In the illustrated example, the object classification system 100 includes a vehicle 102 (e.g., a first vehicle), a vehicle 104 (e.g., a second vehicle), and a vehicle 106 (e.g., a third vehicle) travelling along a road 108 in a same direction. The vehicles 102, 104, 106 are adjacent to each other and travelling in respective lanes 110, 112, 114 of the road 108. For example, the vehicle 102 is located in the lane 110 (e.g., a first lane), the vehicle 104 is located in the lane 112 (e.g., a second lane), and the vehicle 106 is located in the lane 114 (e.g., a third lane).

The vehicles 102, 104, 106 may be a standard gasoline powered vehicle, a hybrid vehicle, an electric vehicle, a fuel cell vehicle, and/or any other mobility implement type of vehicle. The vehicles 102, 104, 106 include parts related to mobility, such as a powertrain with an engine, a transmission, a suspension, a driveshaft, and/or wheels, etc. Further, the vehicles 102, 104, 106 may be non-autonomous, semi-autonomous (e.g., some routine motive functions controlled by the vehicle 102, the vehicle 104, and/or the vehicle 106), or autonomous (e.g., motive functions are controlled by the vehicle 102, the vehicle 104, and/or the vehicle 106 without direct driver input).

In the illustrated example, each of the vehicles 102, 104, 106 of include a sensor 116, a camera 118, and a global positioning sensor (GPS) receiver 120. The sensor 116 detects nearby objects and determine their location relative to the sensor 116. To detect the nearby object and determine its location, the sensor 116 may be a radar sensor that utilizes radio waves, an ultrasonic sensor that utilizes ultrasound waves, or a lidar sensor that utilizes lasers. The camera 118 visually monitors an area proximate to the corresponding vehicles 102, 104, 106. For example, the camera 118 may monitor an object within the area proximate to the corresponding vehicles 102, 104, 106. The GPS receiver 120 monitors a location of the corresponding vehicles 102, 104, 106. Further, in the illustrated example, the sensor 116 and the camera 118 are located toward a front of the corresponding vehicles 102, 104, 106 to facilitate the camera 118 and the sensor 116 to monitor an area in front of the corresponding vehicles 102, 104, 106. Additionally or alternatively, the vehicles 102, 104, 106 may include sensors and/or cameras toward their back and/or side to monitor the areas behind and/or to the side of the vehicles 102, 104, 106.

As illustrated in FIG. 1, each of the vehicles 102, 104, 106 also include a dedicated short range communication (DSRC) module 122 that enable the vehicles 102, 104, 106 to communicate with each other and/or other nearby devices via vehicle-to-vehicle communication and/or vehicle-to-infrastructure communication. The example DSRC modules 122 include antenna(s), radio(s) and software to broadcast messages and to establish connections between the vehicles 102, 104, 106, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

Each of the example vehicles 102, 104, 106 also includes an object classifier 124 that determines a classification and/or a corresponding classification confidence score or value (e.g., a probability, a percentage, etc.) of a nearby object. For example, a motorcycle 126 is located in the lane 112 of the road 108 ahead of the vehicles 102, 104, 106 in FIG. 1. In the illustrated example, the object classifier 124 of each of the respective vehicles 102, 104, 106 classifies the motorcycle 126 as a motorcycle. Additionally or alternatively, the object classifier 124 of each of the respective vehicles 102, 104, 106 may classify detected objects as vehicles (e.g., cars, SUVs, pickup trucks), trucks (e.g., semi-trucks, large vans, buses), bicycles, pedestrians, animals, and/or unknown objects.

In the illustrated example, a roadside unit 128 (e.g., an infrastructure node) of a vehicle-to-infrastructure communication system is adjacent the road 108. For example, the roadside unit 128 includes a sensor or camera that detects and collects information on objects travelling along the road 108 (e.g., the motorcycle) and an object classifier that determines a classification and a corresponding classification confidence score of the detected object. The roadside unit 128 is in communication with one or more of the vehicles 102, 104, 106 via vehicle-to-infrastructure communication to enable one or more of the vehicles 102, 104, 106 to collect classification data from the roadside unit 128. The roadside unit 128 may be positioned on structured located along the road 108 such as a light-post.

Further, in the illustrated example, a person 130 having a mobile device 132 (e.g., a smart phone, a smart watch, a tablet, etc.) is located next to the road 108. The mobile device 132 communicatively connects to a vehicle of the person 130 (e.g., via Bluetooth® communication) when the mobile device 132 is in and/or near the vehicle. For example, the mobile device 132 may receive object classification data (e.g., a classification, a classification confidence score) that is determined by an object classifier of the vehicle of the person 130 when the mobile device 132 is in and/or near the vehicle of the person 130. Additionally, the mobile device may include a sensor (e.g., an accelerometer) that detects if the person 130 is walking with the mobile device 132. When the mobile device 132 is communicatively disconnected from the vehicle of the person 130 and/or the mobile device 132 detects that the person 130 is walking, the mobile device may wirelessly connect (e.g., via LTE®, W-Fi®, etc.) with a nearby device to broadcast object classification data of the vehicle of the person 130 to the nearby device. In the illustrated example, the mobile device 132 communicatively connects to the one or more of the vehicles 102, 104, 106 as the person 130 walks along the road 108 to enable the one or more of the vehicles 102, 104, 106 to collect the classification data determined by the vehicle of the person 130.

In operation, to identify and classify the motorcycle 126, the object classifier 124 of the vehicle 102 initially retrieves data from the sensor 116, the camera 118, and/or the GPS receiver 120 of the vehicle 102. The object classifier 124 collects data from the sensor 116 and/or the camera 118 that detects an object (e.g., the motorcycle) and identifies a location of the object based on the data collected from the sensor 116, the camera 118, and/or the GPS receiver 120. Further, the object classifier 124 may collect visual data from the camera 118 and include an image recognition system that identifies a type or classification and a corresponding confidence score of the detected object. For example, the image recognition system of the object classifier 124 may detect handlebars, a seat, and an engine of an object. In such examples, the object classifier 124 classifies the object as a motorcycle with a high degree in confidence. In other examples, the data collected from the camera 118 may cause the object classifier 124 be less confident in its classification of the object. For example, if the image recognition system identifies handlebars and a seat, but not an engine, the object classifier 124 may classify the object as a motorcycle with less confidence (e.g., an object with handlebars and a seat may alternatively be a bicycle).

To increase the classification confidence for the detected object, the object classifier 124 collects additional information from the nearby vehicles 104, 106 via the DSRC modules 122 of the vehicles 102, 104, 106. For example, the DSRC module 122 of the vehicle 102 broadcasts the collected location data to the other vehicles 104, 106, the roadside unit 128, and/or the mobile device 132. The vehicle 104, the vehicle 106, the roadside unit 128, and/or the mobile device 132 utilizes an algorithm to identify its data (e.g., location data, classification data including a classification and a classification confidence) that correlates to and/or is associate with the data broadcasted by the vehicle 102. For example, the vehicle 104 identifies the data collected from the sensor 116, the camera 118, and/or the GPS receiver 120 of the vehicle 104 that is associated with the object (e.g., the motorcycle 126) detected by the vehicle 102. Additionally or alternatively, the vehicle 106 identifies the data collected from the sensor 116, the camera 118, and/or the GPS receiver 120 of the vehicle 106 that is associated with the object detected by the vehicle 102.

Subsequently, the vehicle 102 retrieves the identified additional data from the vehicle 104, the vehicle 106, the roadside unit 128, and/or the mobile device 132 via the DSRC module 122. For example, the object classifier 124 of the vehicle 102 associates the additional data of the vehicle 104 and/or the vehicle 106 with the data collected by the vehicle 102 and recalculates and/or adjusts the previously determined classification and/or classification confidence based on the additional data. The object classifier 124 may increase the classification confidence relative to the initial classification confidence based on the additional data. In some such examples, the object classifier 124 may increase the classification confidence above a confidence threshold based on the additional data from the other vehicles 104, 106 such that the object classifier 124 is able to classify a previously unclassified object. In other examples, the object classifier may declassify an object and/or change the classification of a detected object from one category (e.g., a bicycle) to another (e.g., a motorcycle). Further, the object classifier 124 may weight data collected from the other vehicles 104, 106 based on respective reliability scores of the other vehicles 104, 106. For example, the vehicle 106 may have a greater reliability score than the vehicle 104 and, thus, the vehicle 102 adjusts its classification and corresponding classification confidence based on the data of the vehicle 106 to a greater extent than that of the vehicle 104.

In the illustrated example, each of the vehicles 102, 104, 106 of the illustrated example included the sensor 116, the camera 118, and/or the GPS receiver 120 from which the corresponding object classifier 124 collects data to detect and classify in object. In other examples, one or more of the vehicles 102, 104, 106 and/or other vehicles of the object classification system 100 may include more or less or less data sources. For example, one or more of the vehicles 102, 104, 106 may not include the GPS receiver 120 such that the object classifier 124 determines a location of a detected object without GPS data. Additionally or alternatively, one or more of the vehicles 102, 104, 106 may not include the sensor 116 such that the object classifier 124 detects an object based on data collected from the camera 118. In other examples, one or more of the vehicles 102, 104, 106 may not include the camera 118. In such examples, the vehicle (e.g., the vehicle 102, the vehicle 104, or the vehicle 106) without the camera 118 collects location data of the detected object and classifies the detected object based on classification data obtained from other nearby vehicles via the DSRC module 122 that correlate to the collected location data.

Figure 2:
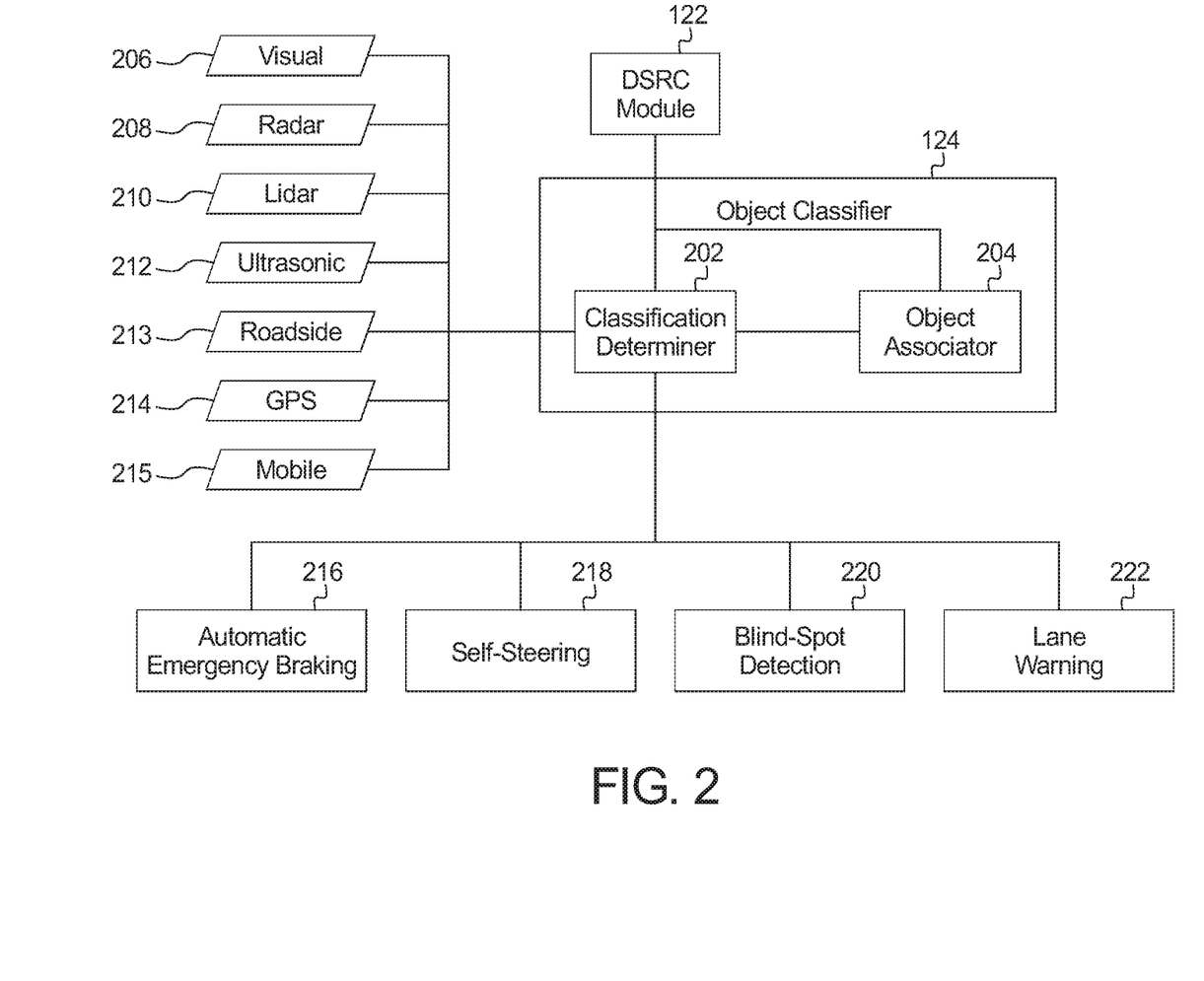
FIG. 2 is a block diagram of an example object classifier of a vehicle of the object classification system of FIG. 1.

FIG. 2 is a block diagram of the object classifier 124 of the vehicle 102 that detects and classifies a nearby object. The object classifier 124 of the illustrated example includes a classification determiner 202 and an object associator 204. While FIG. 2 depicts the object classifier 124 of the vehicle 102, the object classifier 124 of the vehicle 104, the vehicle 106, and any other vehicle of the object classification system 100 may be substantially similar or identical to the object classifier 124 of FIG. 2.

The classification determiner 202 of the object classifier 124 collects visual data 206, radar data 208, lidar data 210, ultrasonic data 212, roadside data 213, GPS data 214, and/or mobile device 215 data from sensors, cameras, and/or receivers of the vehicle 102 (e.g., a first vehicle) and/or from other data sources to detect an object and identify a location of the detected object. For example, the object classifier 124 collects the visual data 206 from the camera 118, the radar data 208 from a radar sensor (e.g., the sensor 116 and/or a radar sensor 316 of FIG. 3), the lidar data 210 from a lidar sensor (e.g., the sensor 116 and/or a lidar sensor 318 of FIG. 3), the ultrasonic data 212 from an ultrasonic sensor (e.g., the sensor 116 and/or an ultrasonic sensor 314 of FIG. 3), the roadside data 213 from the roadside unit 128, the GPS data 214 from the GPS receiver 120, and/or the mobile device data 215 from the mobile device 132 of the person 130.

The classification determiner 202 also collects the visual data 206 from the camera 118 to determine a classification of the detected object. For example, the classification determiner 202 includes an object identification system that determines classification data (e.g., first classification data) associated with an object within images captured by the camera 118. The classification data includes a classification (e.g., an object type, a category, etc.), a corresponding classification confidence score or value (e.g., a probability, a percentage, etc.), a location (e.g., a first location) and/or other data associated with the detected object. For example, classification determiner 202 may detect a size, handlebars, and a seat of an object. Based on the visual data 206, the object identification system of the classification determiner 202 determines a classification (e.g., a vehicle, a truck, a motorcycle, a bicycle, a pedestrian, an animal, or an unknown object) and a corresponding classification confidence score. In some examples, the classification determiner 202 classifies the detected object when the classification confidence is greater than or equal to a confidence threshold. If the classification confidence is less than the confidence threshold, the detect object remains unclassified.

Upon determining the classification data, the classification determiner 202 communicates the classification data to the DSRC module 122 of the vehicle 102. Subsequently, the DSRC module 122 broadcasts the classification data to nearby vehicles (e.g., the vehicles 104, 106) and/or other devices (e.g., the roadside unit 128, the mobile device 132) via, for example, vehicle-to-vehicle communication or vehicle-to-infrastructure communication. The vehicle 104, the vehicle 106, the roadside unit 128, and/or the mobile device 132 identify their respective classification data that correlate and/or are associated with the classification data of the vehicle 102. For example, the vehicle 104 (e.g., a second vehicle) compares location data of its classification data (e.g., a second location of second location data) with location data of the classification data of the vehicle 102 (e.g., a first location of first location data) to identify the classification data of the vehicle 104 that is associated with the detected object. Additionally or alternatively, the vehicle 106 (e.g., a third vehicle) compares location data of its classification data (e.g., a third location of third location data) with the location data of the classification data of the vehicle 102 to identify the classification data of the vehicle 106 that is associated with the detected object. In some examples, the vehicle 104, the vehicle 106, the roadside unit 128, and/or the mobile device 132 utilizes a nearest-neighbor algorithm, a joint-compatibility branch-and-bound algorithm, and/or another pattern recognition algorithm to identify the classification data associated with the classification data of the vehicle 102.

Upon the vehicle 104, the vehicle 106, the roadside unit 128, and/or the mobile device 132 identifying classification data, the object classifier 124 of the vehicle 102 retrieves or collects, via the DSRC module 122, the classification data identified by the vehicle 104, the vehicle 106, the roadside unit 128, and/or the mobile device 132. Further, the object associator 204 associates or correlates the classification data retrieved from the vehicle 104, the vehicle 106, the roadside unit 128, and/or the mobile device 132 with the classification data of the vehicle 102. For example, the object associator 204 may need to compare and identify the classification data associated with the detected object if the vehicle 102 retrieves more data from the vehicle 104, the vehicle 106, the roadside unit 128, and/or the mobile device 132 than is associated with the detected object. In some examples, the object associator 204 of the vehicle 102 utilizes a nearest-neighbor algorithm, a joint-compatibility branch-and-bound algorithm, and/or another pattern recognition algorithm to identify the classification data retrieved from the vehicle 104, the vehicle 106, the roadside unit 128, and/or the mobile device 132 that is associated with the object detected by the vehicle 102.

After the object associator 204 associates the classification data of the vehicle 102 with the classification data of the vehicle 104, the vehicle 106, the roadside unit 128, and/or the mobile device 132, the classification determiner 202 adjusts the classification data (e.g., the classification, the classification confidence) of the vehicle 102 based on the classification data of the vehicle 104, the vehicle 106, the roadside unit 128, and/or the mobile device 132. For example, to adjust the classification data of the vehicle 102, the classification determiner 202 performs a probabilistic algorithm (e.g., random selection within strata, greedy matching, nearest-neighbor matching, regression adjustment, weighting within strata, proportional weighting within strata, inverse propensity weighting, etc.) to incorporate the classification data of the other vehicles 104, 106 into the classification data of the vehicle 102.

In some examples, the classification determiner 202 of the object classifier 124 weighs some classification data (e.g., the classification data of the vehicle 104) more than other classification data (e.g., the classification data of the vehicle 106) based on respective reliability scores of the vehicles 104, 106. For example, classification determiner 202 may have determined that the classification data of the vehicle 104 is more reliable than the classification data of the vehicle 106. In such examples, the classification determiner 202 considers the classification data of the vehicle 104 more than that of the vehicle 106 when adjusting the classification data of the vehicle 102 associated with the detected object. The classification determiner may determine a reliability score of a vehicle based on past history (e.g., a trustworthiness or accuracy of previous data collected from the vehicle), a sensor type from which the data is collected (e.g., one sensor type may be more reliable than another), a distance between the vehicle and the detected object (e.g., radar sensors are more accurate than ultrasonic sensors for large distances, ultrasonic sensors are more accurate than radar sensors for short distances), environmental conditions in which measurements were taken (e.g., temperature, ambient light, humidity, vehicle conditions), a model year of the vehicle, miles driven by the vehicle, etc.

Upon adjusting the classification and/or classification confidence, object classifier 124 provides the classification data to systems of the vehicle 102. For example, the classification determiner 202 of the object classifier 124 provides the classification data to the systems of the vehicle 102 if the adjusted classification confidence is greater than a threshold value. As illustrated in FIG. 2, the object classifier 124 provides the adjusted classification data to a automatic emergency braking system 216, a self-steering system 218, a blind-spot detection system 220, a lane warning system 222. The automatic emergency braking system 216 may utilize the classification data to determine whether to apply brakes of the vehicle 102 (e.g., to avoid a collision with the detected object), and the self-steering system 218 may utilize the classification data to determine whether to adjust a direction of travel of the vehicle 102 (e.g., to avoid a collision with the detected object). Further, the blind-spot detection system 220 and/or the lane warning system 222 may utilize the classification data to determine whether to warn a driver of the vehicle 102 of the detected object.

Figure 3:
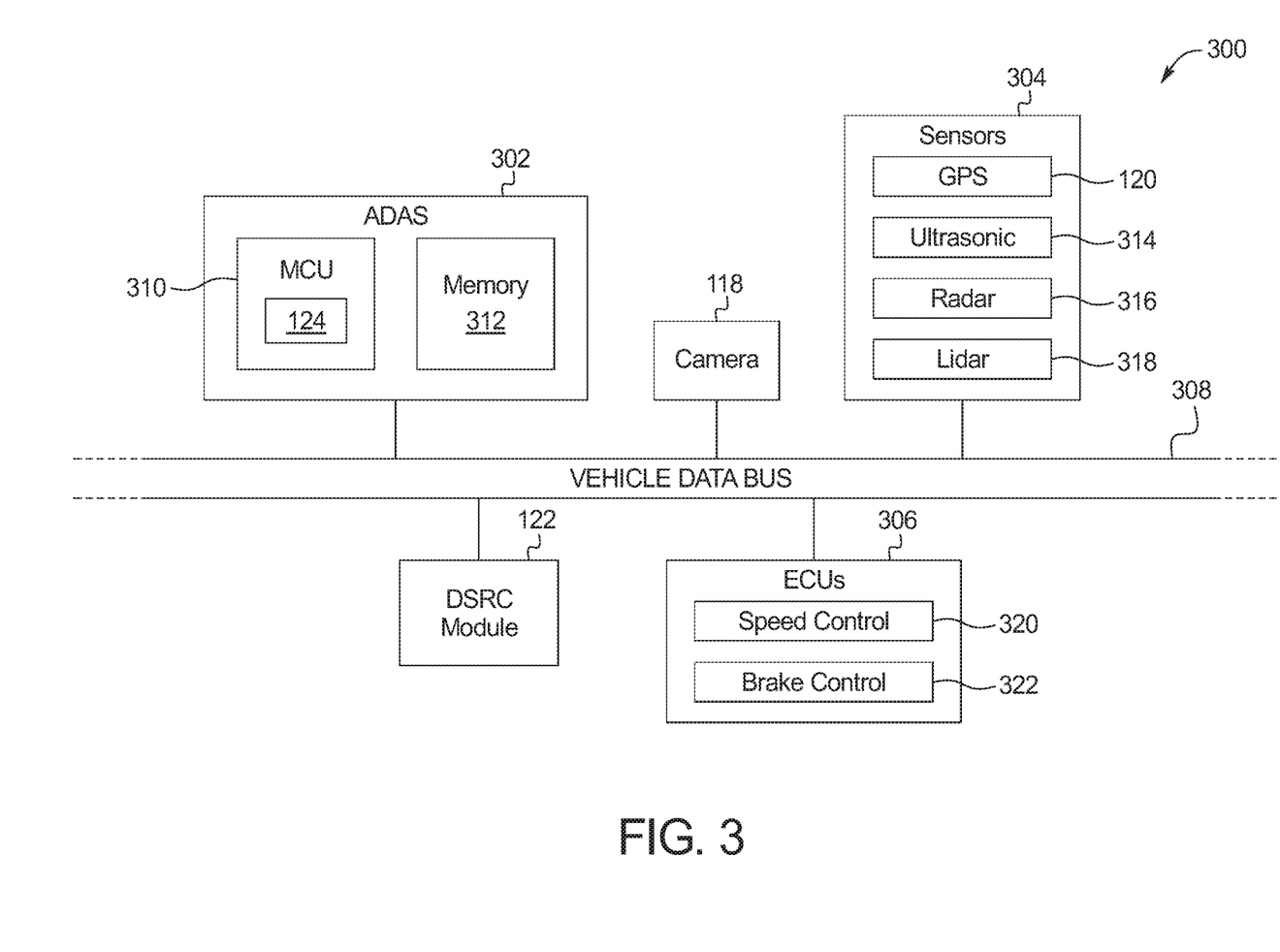
FIG. 3 is a block diagram of electronic components of a vehicle of the object classification system of FIG. 1.

FIG. 3 is a block diagram of electronic components 300 of the vehicle 102. The example electronic components 300 include an advanced driving assistance system (ADAS) unit 302, the camera 118, sensors 304, the DSRC module 122, electronic control units (ECUs) 306, and a vehicle data bus 308. While FIG. 3 depicts the electronic components 300 of the vehicle 102, the electronic components 300 of the vehicle 104, the vehicle 106, and any other vehicle of the object classification system 100 may be substantially similar or identical to the electronic components 300 of FIG. 3.

The ADAS unit 302 facilitates situational awareness around the vehicle 102. The ADAS unit 302 may include, be incorporated into, and/or provide data to vehicle systems that provide guidance and assistance to drivers, such as the automatic emergency braking system 216, the self-steering system 218, the blind-spot detection system 220, the lane warning system 222, etc. The ADAS unit 302 uses cameras (e.g., the camera 118) and/or sensors (e.g., the sensors 304) to detect and identify objects (e.g. the motorcycle 126) around the vehicle 102.

In the illustrated example, the ADAS unit 302 includes a microcontroller unit, controller or processor 310 and memory 312. In some examples, the ADAS unit 302 is structured to include object classifier 124. Alternatively, in some examples, the object classifier 124 is into another electronic control unit (ECU) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 are arranged in and around the vehicle 102 to monitor properties of the vehicle 102 and/or an environment in which the vehicle 102 is located. One or more of the sensors 304 may be mounted to measure properties around an exterior of the vehicle 102. Additionally or alternatively, one or more of the sensors 304 may be mounted inside a cabin of the vehicle 102 or in a body of the vehicle 102 (e.g., an engine compartment, wheel wells, etc.) to measure properties in an interior of the vehicle 102. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include the GPS receiver 120, the ultrasonic sensor 314, the radar sensor 316, and the lidar sensor 318. For example, the GPS receiver 120 collects the GPS data 214, the ultrasonic sensor 314 collects the ultrasonic data 212, the radar sensor 316 collects the radar data 208, and the lidar sensor 318 collects the lidar data 210 utilized by the object classifier 124 to detect, locate, and classify a nearby object.

The ECUs 306 monitor and control the subsystems of the vehicle 102. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 102 may have seventy or more of the ECUs 306 that are positioned in various locations around the vehicle 102 and are communicatively coupled by the vehicle data bus 308. In the illustrated example, the ECUs 306 include a speed control unit 320 and a brake control module 322. For example, the speed control unit 320 controls a speed of the vehicle 102 (e.g., performs auto-cruise) and the brake control module 322 controls brakes of the vehicle 102 based on input received from the camera 118, the sensors 304, and/or a driver of the vehicle 102.

The vehicle data bus 308 communicatively couples the camera 118, the DSRC module 122, the ADAS unit 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
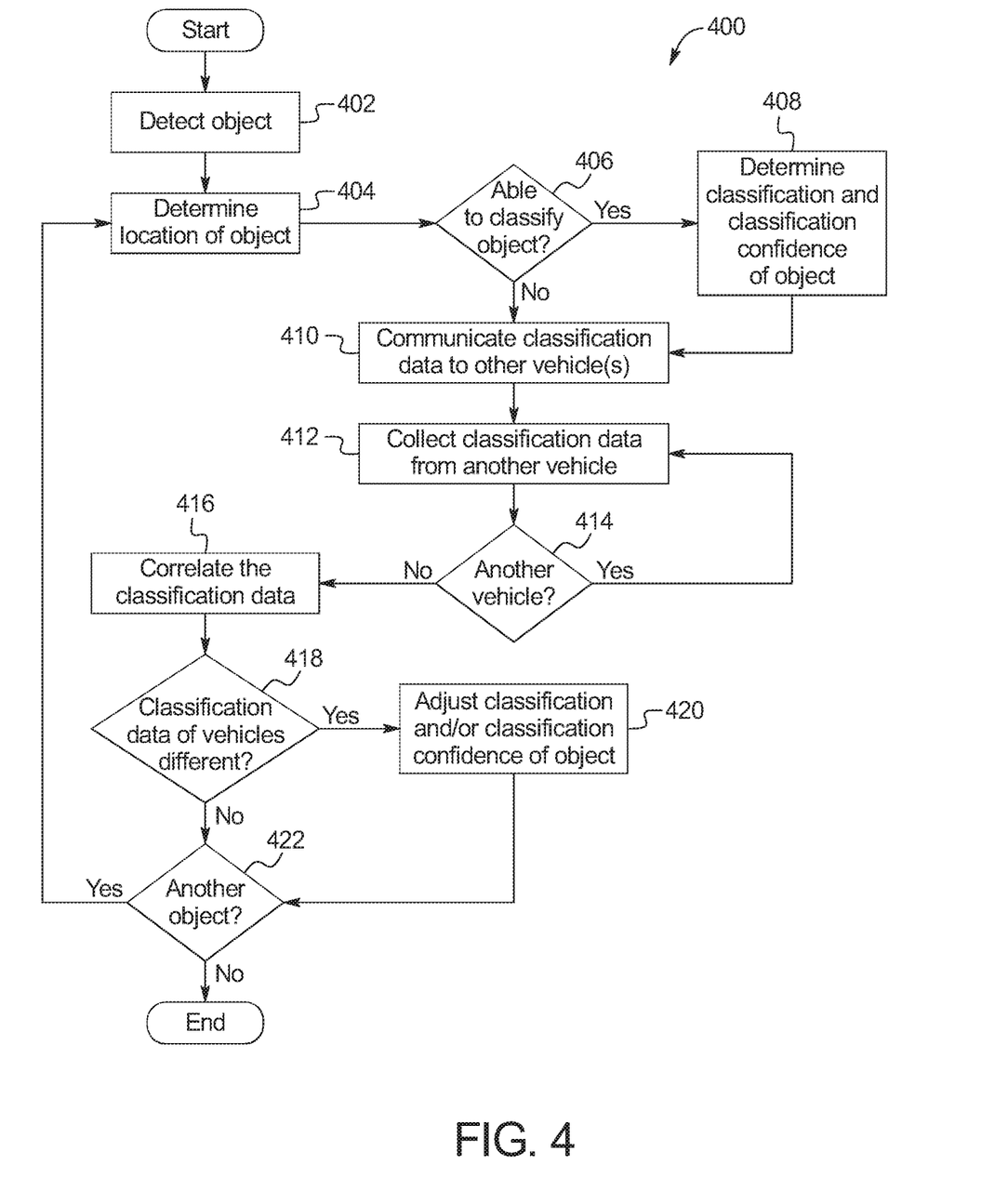
FIG. 4 is a flowchart of an example method to adjust a classification of an object via the object classifier of FIG. 2.

FIG. 4 is a flowchart of an example method 400 to adjust a classification of an object via the object classifier 124. The flowchart of FIG. 4 is representative of machine readable instructions that are stored in memory (e.g., the memory 312 of FIG. 3) and include one or more programs which, when executed by a processor (e.g., the processor 310 of FIG. 3), cause the vehicle 102 to implement the example classification determiner 202, the example object associator 204, and, more generally, the example object classifier 124 of FIG. 2. While the example program is described with reference to the flowchart illustrated in FIG. 4, many other methods of implementing the example classification determiner 202, the example object associator 204, and, more generally, the example object classifier 124 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below. Also, while the example method 400 is described with respect to the object classifier 124 of the vehicle 102, the example method 400 may utilized to implement the object classifier 124 of the vehicle 104, the vehicle 106, and any other vehicle of the object classification system 100.

Initially, at block 402, a sensor and/or a camera of the vehicle 102 (e.g., a first vehicle) detects an object. For example, the sensor 116, the camera 118, and/or one or more of the sensors 304 detects the object. At block 404, the classification determiner 202 of the object classifier 124 determines a location of the detected object. For example, the classification determiner 202 determines the location based on the visual data 206 collected from the camera 118, the radar data 208 collected from the sensor 116 and/or the radar sensor 316, the lidar data 210 collected from the sensor 116 and/or the lidar sensor 318, the ultrasonic data collected from the sensor 116 and/or the ultrasonic sensor 314, and/or the GPS data 214 collected from the GPS receiver 120.

At block 406, the object classifier 124 determines whether the classification determiner 202 is able to classify the detected object. For example, the object classifier 124 determines that the classification determiner 202 is able to classify the object if the vehicle 102 includes the camera 118 and the visual data 206 collected by the camera 118 includes data corresponding to the detected object. If the classification determiner 202 is able to classify the object, the classification determiner 202 determines classification data, such as a classification and a classification confidence, of the detected object at block 408. For example, the classification determiner 202 classifies the object as a vehicle, a truck, a motorcycle, a bicycle, a pedestrian, an animal, or an unknown object and determines a corresponding confidence score associated with the classification.

At block 410, upon determining the classification data and/or upon determining that the object is unable to be classified, the classification determiner 202 communicates the classification data (e.g., first communication data including a first location data, a classification, and/or a classification confidence) to another vehicle. For example, the classification determiner 202 communicates the classification data to the DSRC module 122 of the vehicle 102. Subsequently, the DSRC module 122 of the vehicle 102 broadcasts the classification data to the DSRC modules 122 of the nearby vehicles 104, 106 to enable the vehicles 104, 106 to identify the corresponding classification data.

At block 412, the object classifier 124 collects classification data from another vehicle. For example, the object classifier 124 retrieves second classification data from a second vehicle (e.g., the vehicle 104) via the DSRC module 122. At block 414, the object classifier 124 determines whether there is another vehicle from which to collect classification data. If there is another vehicle, block 412 is repeated. For example, the object classifier 124 retrieves additional classification data (e.g., third classification data) from a third vehicle (e.g., the vehicle 106). Additionally or alternatively, the object classifier 124 may retrieve additional classification data (e.g., third classification data) from other data sources, such as the roadside unit 128 and/or the mobile device 132 that is near the road 108. Blocks 412, 414 are repeated until classification data is collected from all the identified nearby vehicles.

At block 416, the object associator 204 of the object classifier 124 correlates the classification data of the vehicle 102 with the classification collected from the other vehicles. For example, the object associator 204 associates second classification data collected from a second vehicle and/or third classification data collected from a third vehicle with the classification data collected by the vehicle 102. The object associator 204 may correlate data, via a nearest-neighbor algorithm or a joint-compatibility branch-and-bound algorithm, by comparing a first location of the classification data collected by the vehicle 102 with a second location of second classification data collected by the second vehicle.

At block 418, the classification determiner 202 of the object classifier 124 determines whether the classification data of the vehicle 102 is different than the classification data of the nearby vehicle(s). If the classification data are different, the classification determiner 202 adjusts the classification and/or the classification confidence of the detected object based on the classification data of the other vehicle(s). For example, the classification determiner 202 performs an algorithm (e.g., a probabilistic algorithm) to incorporate the various classification data when determining the classification and/or the classification confidence of the detected object. In some examples, when adjusting the classification data of the vehicle 102, the classification determiner 202 weights one classification data (e.g., the second classification data) more than another classification data (e.g., the third classification data) based on respective reliability scores of the vehicles associated with the classification data.

Upon determining and/or adjusting the classification data associated with the detected object, the object classifier 124 determines whether there is another object detected by the sensors, cameras, and/or receivers of the vehicle 102. If another object is detected, blocks 404, 406, 408, 410, 412, 414, 416, 418, 420, 422 are repeated until no other object is identified at which point the method 400 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method comprising:
   detecting an object via a camera of a first vehicle;
   determining, via a processor of the first vehicle, first classification data that includes a first classification confidence and a location for the object;
   broadcasting the first classification data from the first vehicle to enable a second vehicle to identify second classification data that includes a second classification confidence for the object;
   determining, via a second processor of the second vehicle, that the first classification data and the second classification data includes the location;
   collecting the second classification data at the first vehicle from the second vehicle;
   determining, via the processor of the first vehicle, a reliability score for the second vehicle; and
   adjusting the first classification confidence for the object based on the second classification data and the reliability score of the second vehicle.

2. The method of claim 1, further including broadcasting the first classification confidence of the object to the second vehicle after adjusting the first classification confidence based on the second classification data of the second vehicle.

3. The method of claim 1, further including at least one of emitting a warning to a driver and performing an autonomous motive function based upon the first classification data of the object.

4. A vehicle comprising:
   a camera for detecting an object;
   a communication module; and
   a controller configured to:
      determine first classification data for the object, the first classification data including a first classification confidence and a location;
      broadcast, via the communication module, the first classification data to enable a second vehicle to identify second classification data of the object;
      collect, via the communication module, the second classification data that includes a second classification confidence and the location from the second vehicle;
      in response to determining that the first classification data and the second classification data includes the location, associate the second classification data with the first classification data;
      adjust the first classification confidence of the object based on the second classification data; and
      determine a reliability score for the second vehicle and adjust the first classification confidence of the object further based on the reliability score of the second vehicle.

5. The vehicle of claim 4, further including a radar sensor that collects location data of the object to enable the controller to determine a location of the object.

6. The vehicle of claim 4, wherein the controller further adjusts at least one of the first classification data and the first classification confidence based on third classification data collected from at least one of a roadside unit and a mobile device.

7. The vehicle of claim 4, wherein the first classification data of the object is selected from the group consisting of a car, a motorcycle, an SUV, a pickup truck, a semi-truck, a van, a bus, a bicycle, a pedestrian, and an animal.

8. The vehicle of claim 4, wherein the controller is configured to:
   reduce the reliability score upon determining that data collected by the second vehicle is less reliable; and
   increase the reliability score upon determining that the data collected by the second vehicle is more reliable.

9. The vehicle of claim 4, wherein the controller is configured to adjust the first classification data based on the second classification confidence and the reliability score of the second vehicle, the controller weights the second classification confidence with the reliability score.

10. The vehicle of claim 4, wherein the controller determines the reliability score of the second vehicle based on historical data of the second vehicle.

11. The vehicle of claim 4, wherein the controller determines the reliability score of the second vehicle based on:
   a type of sensor of the second vehicle that detected the object; and
   a distance between the second vehicle and the detected object.

12. The vehicle of claim 4, wherein the controller determines the reliability score of the second vehicle based on an environmental condition when a sensor of the second vehicle detected the object.

13. The vehicle of claim 4, wherein the controller determines the reliability score of the second vehicle based on at least one of an age and a mileage of the second vehicle.

14. The vehicle of claim 4, wherein, to adjust the first classification configured based on the second classification confidence and the reliability score of the second vehicle, the controller weights the second classification confidence with the reliability score.

15. The vehicle of claim 4, wherein the controller determines the reliability score of the second vehicle based on historical data of the second vehicle.

16. The vehicle of claim 4, wherein the controller determines the reliability score of the second vehicle based on:
   a type of sensor of the second vehicle that detected the object; and
   a distance between the second vehicle and the detected object.

17. The vehicle of claim 4, wherein the communications module is a dedicated short-range communications module.

* * * * *